(12) United States Patent
Gupta et al.

(10) Patent No.: US 7,330,437 B1
(45) Date of Patent: Feb. 12, 2008

(54) CHECKING CONNECTIVITY FOR POINT-TO-MULTIPOINT CONNECTIONS

(75) Inventors: Puneet Gupta, Sunnyvale, CA (US); Mana Palai, San Jose, CA (US); Muthumayan Madhayyan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

(21) Appl. No.: 10/632,647

(22) Filed: Aug. 1, 2003

(51) Int. Cl.
*H04J 1/16* (2006.01)
(52) U.S. Cl. .................................. 370/241.1; 370/249
(58) Field of Classification Search ...................... None
See application file for complete search history.

(56) References Cited

U.S. PATENT DOCUMENTS

| | | | |
|---|---|---|---|
| 5,751,698 A * | 5/1998 | Cushman et al. | 370/252 |
| 5,872,770 A * | 2/1999 | Park et al. | 370/241.1 |
| 6,181,680 B1 * | 1/2001 | Nagata et al. | 370/248 |
| 6,643,254 B1 * | 11/2003 | Kajitani et al. | 370/217 |
| 6,807,497 B2 * | 10/2004 | Kalem et al. | 702/72 |
| 6,847,608 B1 * | 1/2005 | Soo et al. | 370/228 |
| 6,982,958 B2 * | 1/2006 | Iruela et al. | 370/236 |
| 7,016,947 B1 * | 3/2006 | Ah Sue | 709/221 |
| 7,088,474 B2 * | 8/2006 | Li et al. | 358/3.27 |
| 7,151,747 B2 * | 12/2006 | Isoyama | 370/235 |

* cited by examiner

*Primary Examiner*—Andrew C. Lee
(74) *Attorney, Agent, or Firm*—Stolowitz Ford Cowger LLP

(57) ABSTRACT

A method and system thereof for checking connectivity between endpoints in a network are described. A message is sent from an originating endpoint to a terminating endpoint. The message directs the terminating endpoint to enable detection of continuity check cells used for checking connectivity between the originating endpoint and the terminating endpoint. The terminating endpoint is programmed to suppress generation of continuity check cells. Continuity check cells are sent from the originating endpoint to the terminating endpoint. The originating endpoint is programmed to refrain from acting in response to an absence of continuity check cells from the terminating endpoint.

36 Claims, 2 Drawing Sheets

400

410
SEND A MESSAGE TO A TERMINATING ENDPOINT, THE MESSAGE DIRECTING THE TERMINATING ENDPOINT TO ENABLE DETECTION OF CC CELLS AND NOT TO GENERATE CC CELLS

420
SEND CC CELLS TO THE TERMINATING ENDPOINT

430
REFRAIN FROM ENTERING A FAIL STATE WHEN CC CELLS ARE NOT RECEIVED FROM THE TERMINATING ENDPOINT

400

410
SEND A MESSAGE TO A TERMINATING ENDPOINT, THE MESSAGE DIRECTING THE TERMINATING ENDPOINT TO ENABLE DETECTION OF CC CELLS AND NOT TO GENERATE CC CELLS

420
SEND CC CELLS TO THE TERMINATING ENDPOINT

430
REFRAIN FROM ENTERING A FAIL STATE WHEN CC CELLS ARE NOT RECEIVED FROM THE TERMINATING ENDPOINT

510
RECEIVE A MESSAGE FROM AN ORIGINATING ENDPOINT, THE MESSAGE DIRECTING A TERMINATING ENDPOINT TO ENABLE DETECTION OF CC CELLS AND NOT TO GENERATE CC CELLS

520
SEND AN ALERT TO A NETWORK MANAGER WHEN CC CELLS FROM THE ORIGINATING ENDPOINT ARE NOT RECEIVED

Figure 5

CHECKING CONNECTIVITY FOR POINT-TO-MULTIPOINT CONNECTIONS

TECHNICAL FIELD

Embodiments of the present invention pertain to networks and telecommunication. Specifically, embodiments of the present invention pertain to checking connectivity between endpoints in networks.

BACKGROUND ART

Operations, administration and maintenance (OAM) functionality provides network operators with a set of important tools for managing and troubleshooting connection-related problems. OAM cells such as continuity check (CC) cells are used to check the connectivity between two endpoints. Each of the endpoints is programmed to generate and detect CC cells. The CC cells are sent from each endpoint to the other on a regular basis. If an endpoint does not receive a CC cell from the other endpoint, or does not receive CC cells at a specified frequency, an alarm can be generated. The alarm generally takes the form of the connection going into failed state, which can in turn result in the sending of a message to a network operator, who can then take corrective actions.

The technique just described works well for point-to-point connections, because each endpoint only communicates with its counterpart and because communication between the endpoints is bi-directional. However, this technique does not work for point-to-multipoint connections, in which an originating endpoint broadcasts a message to multiple terminating endpoints. In point-to-multipoint connections, communication is uni-directional, meaning that the originating endpoint can send messages to the terminating endpoints, but the terminating endpoints cannot send messages to the originating endpoint. Thus, terminating endpoints cannot send CC cells to the originating endpoint.

Accordingly, a method and/or system that can provide OAM functionality for point-to-multipoint connections would be advantageous. The present invention provides a novel solution to this problem and related problems.

SUMMARY OF THE INVENTION

Embodiments of the invention pertain to methods and systems for checking connectivity between endpoints in a network. In general, an originating endpoint is programmed to send continuity check cells but to not detect them or respond to their absence, while the terminating endpoint is programmed to detect continuity check cells but to not generate and/or send them.

According to one embodiment, a message is sent from an originating endpoint to a terminating endpoint. The message directs the terminating endpoint to enable detection of continuity check cells used for checking connectivity between the originating endpoint and the terminating endpoint. The terminating endpoint is programmed to not generate continuity check cells. Continuity check cells are sent from the originating endpoint to the terminating endpoint. The originating endpoint is programmed to refrain from acting in response to an absence of continuity check cells from the terminating endpoint.

Embodiments of the present invention are particularly useful for checking point-to-multipoint connections, in which the originating endpoint is in communication with a number of terminating endpoints, and in which communication is uni-directional (from the originating endpoint to the terminating endpoints) but not bi-directional.

This object and advantage of the present invention as well as others will be recognized by those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart of a process for checking connectivity that is implemented by an originating endpoint according to an embodiment of the present invention.

FIG. 5 is a flowchart of a process for checking connectivity that is implemented by a terminating endpoint according to an embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending" or "receiving" or "directing" or "acting" or "suppressing" or "generating" or "providing" or "notifying" or "setting up" or the like, refer to the action and processes (e.g., flowcharts 400 and 500 of FIGS. 4 and 5, respectively) of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
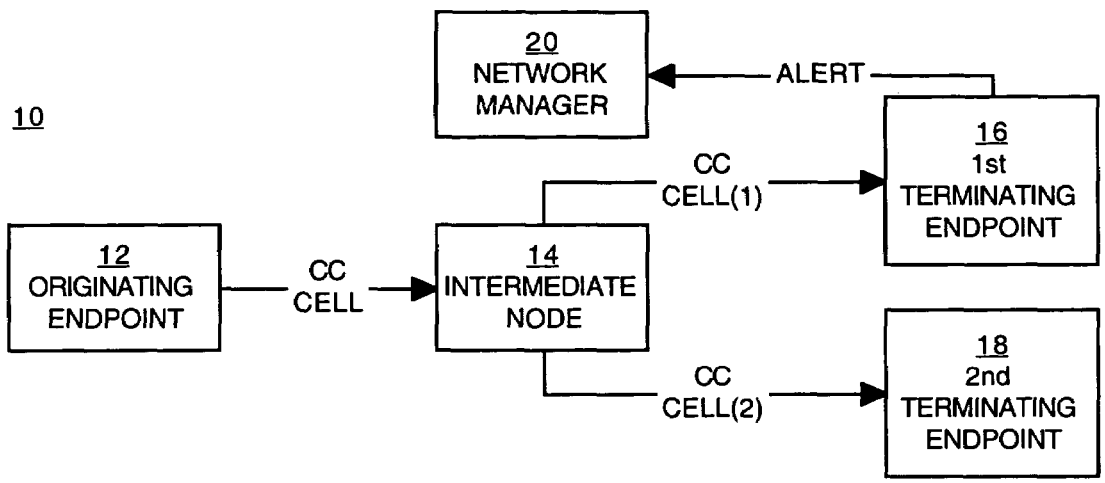
FIG. 1 is a block diagram of a portion of a network, showing messages for checking connectivity between endpoints according to embodiments of the present invention.
Figure 2:
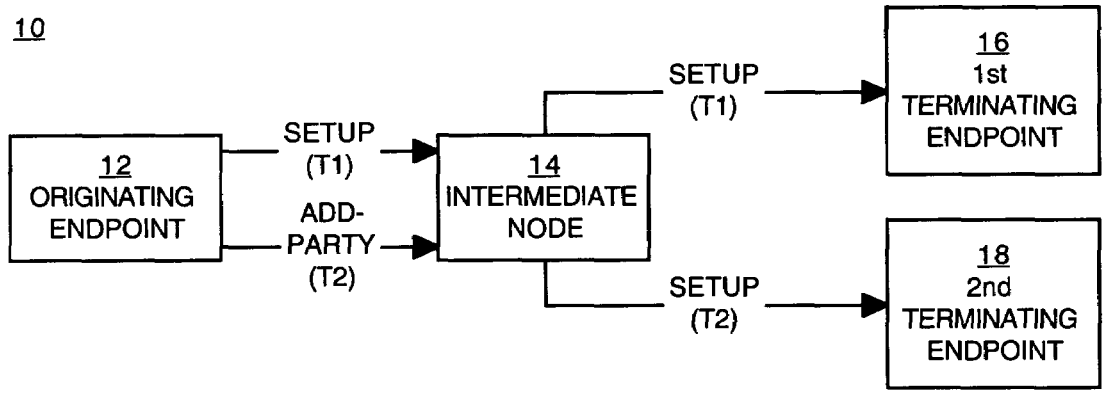
FIG. 2 is a block diagram of a portion of a network, showing messages for establishing connectivity between endpoints according to embodiments of the present invention.

FIGS. 1 and 2 are block diagrams of a portion of a network 10 according to embodiments of the present invention. In one embodiment, network 10 is a representation of an asynchronous transfer mode (ATM) network. In one such embodiment, network 10 represents a telecommunication network.

In the example of FIGS. 1 and 2, the network 10 includes an originating endpoint 12, an intermediate node 14, a first terminating endpoint 16, a second terminating endpoint 18, and a network manager 20. The network 10 can include more elements than the example illustrated in the figures. Also, there can be additional intermediate nodes located between the originating endpoint 12 and the first and second terminating endpoints 16 and 18, or there may not be an intermediate node 14 between the originating endpoint 12 and the first and second terminating endpoints 16 and 18.

The term "endpoint" is used herein to refer to an originating node or a terminating node of a communication path or connection. That is to say, an endpoint does not necessarily refer to an endmost node in a network.

In one embodiment, the originating endpoint 12, the intermediate node 14, the first terminating endpoint 16, and the second terminating endpoint 18 are switches. Network manager 20 can be a device such as a computer system. As will be seen, one function of network manager 20 is to receive alerts from the first and second terminating endpoints 16 and 18 when a connectivity problem is suspected. Network manager 20 can either troubleshoot the potential problem automatically or can alert a human to the potential problem. Network manager 20 is sometimes referred to as a network management station.

The connection from originating endpoint 12 to the first and second terminating endpoints 16 and 18 can be referred to as a point-to-multipoint connection. Communication is uni-directional from originating endpoint 12 to the first and second terminating endpoints 16 and 18, but is not bi-directional between these endpoints.

In one embodiment, continuity check (CC) cells are used to check connectivity between endpoints. In the parlance of ATM networks, the term "cell" is analogous to a data packet or message. Although the present invention is described in the context of CC cells, the present invention is not so limited.

With reference to FIG. 1, according to the embodiments of the present invention, an originating endpoint (e.g., originating endpoint 12) in a point-to-multipoint connection is provisioned, or programmed, to generate CC cells but is not programmed to detect CC cells. In addition, according to these embodiments, terminating endpoints (e.g., first and second terminating endpoints 16 and 18) in a point-to-multipoint connection are programmed to detect CC cells, but are not programmed to generate and/or send CC cells. This represents a significant departure from the provisioning of originating and terminating endpoints in point-to-point connections. For point-to-point connections, the originating endpoint and the terminating endpoint are each programmed to both detect and generate CC cells.

Continuing with reference to FIG. 1, the operation of network 10 according to embodiments of the present invention is now described. Originating endpoint 12 generates a CC cell for the connection with first and second terminating endpoints 16 and 18. Such cells are typically generated at a prescribed frequency; that is, over a certain period of time, a prescribed number of CC cells are generated by originating endpoint 12. Accordingly, the first and second terminating endpoints 16 and 18 are programmed to expect CC cells at the prescribed frequency.

In the present embodiment, at intermediate node 14, the CC cell from originating endpoint 12 is replicated as CC cells (1) and (2). CC cell (1) is forwarded to first terminating endpoint 16, and CC cell (2) is forwarded to second terminating endpoint 18.

Should CC cell (1) not be received by first terminating endpoint 16, for example, or should first terminating endpoint 16 not receive CC cells at the expected frequency, then first terminating endpoint 16 can send an alert to network manager 20. The alert is intended to notify the network manager 20 of a potential problem with the connection between originating endpoint 12 and first terminating endpoint 16.

Referring now to FIG. 2, messages for conveying information about the continuity check from the originating endpoint 12 to the first and second terminating endpoints 16 and 18 are described. It is important to convey information about the continuity check to the first and second terminating endpoints 16 and 18 so that, with regard to continuity checks, the behavior of the first and second terminating endpoints 16 and 18 is appropriate for a point-to-multipoint connection. That is to say, if originating endpoint 12 will be generating CC cells, then first and second terminating endpoints 16 and 18 should be programmed to expect CC cells. Furthermore, the first and second terminating endpoints 16 and 18 should be programmed to not generate and/or to not send CC cells.

In the present embodiment, a setup message is used to set up a connection between an originating endpoint (e.g., originating endpoint 12) and a terminating endpoint (e.g., first terminating endpoint 16). In this embodiment, an add-party message is used to add another party to the connection, e.g., to add a connection between originating endpoint 12 and second terminating endpoint 18 after a connection between originating endpoint 12 and first terminating endpoint 16 has been previously set up. The setup message establishes the communication path between originating endpoint 12 and intermediate node 14 when the connection between originating endpoint 12 and first terminating endpoint 16 is made. The add-party message is in essence a special case of a setup message, in which the information used for setting up a connection between originating endpoint 12 and intermediate node 14 is not repeated.

According to the embodiments of the present invention, information about the continuity check is added to a message that is used to set up a connection or to add a party to a connection. The information in the message directs the terminating endpoints (e.g., first and second terminating endpoints 16 and 18) to enable detection of CC cells from the originating endpoint (e.g., originating endpoint 12). In essence, the information in the message notifies the terminating endpoints that the originating endpoint will be sending CC cells and directs the terminating endpoints to expect them. In one embodiment, the information in the message also directs the terminating endpoints to not generate CC cells and/or to not send CC cells to the originating endpoint.

The terminating endpoints can be provisioned with default settings as to whether or not to detect CC cells, whether or not to generate CC cells, and whether or not to send CC cells. In general, the information in the setup or add-party message changes any default settings into settings appropriate for point-to-multipoint connections. For example, when the default setting is to not detect CC cells, this feature can be selectively turned on based on the information in the setup or add-party message. Thus, according to an embodiment of the present invention, terminating endpoints can be provisioned to detect CC cells but to suppress generating and/or sending CC cells in accordance with their default settings and the information in the setup or add-party message.

In one embodiment, the setup and add-party messages are based on the setup and add-party messages that are established according to ATM Forum standards. According to ATM Forum standards, setup and add-party messages include an information element known as the Generic Application Transport Information Element (GAT IE). The GAT IE can be used to program terminating endpoints in a point-to-multipoint connection for continuity checks (e.g., to detect CC cells). In other words, in one embodiment, the GAT IE is used to carry information about the continuity check to the terminating endpoints. It is appreciated that, instead of using the GAT IE, another information element in the setup and add-party message can be appropriated for conveying information about the continuity check. Alternatively, a new information element can be added to these messages and used to convey information about the continuity check. However, using an existing information element versus a new information element provides an advantage in that existing cell formats can be used.

In summary, referring to both FIGS. 1 and 2, originating endpoint 12 uses a setup message to establish connectivity with first terminating endpoint 16, and an add-party message to establish connectivity with second terminating endpoint 18. In the setup and add-party messages, the first and second terminating endpoints 16 and 18 are directed to enable detection of CC cells, if not already provisioned to do so according to their respective default settings. The first and second terminating endpoints 16 and 18 can also be directed to suppress generating and sending CC cells, if not already provisioned to do so according to their default settings. Originating endpoint 12 then broadcasts CC cells to the first and second terminating endpoints 16 and 18. If a terminating endpoint (e.g., terminating endpoint 16) does not receive a CC cell, or does not receive them at the expected frequency, then network manager 20 is notified of a possible problem with the connection.

Figure 3:
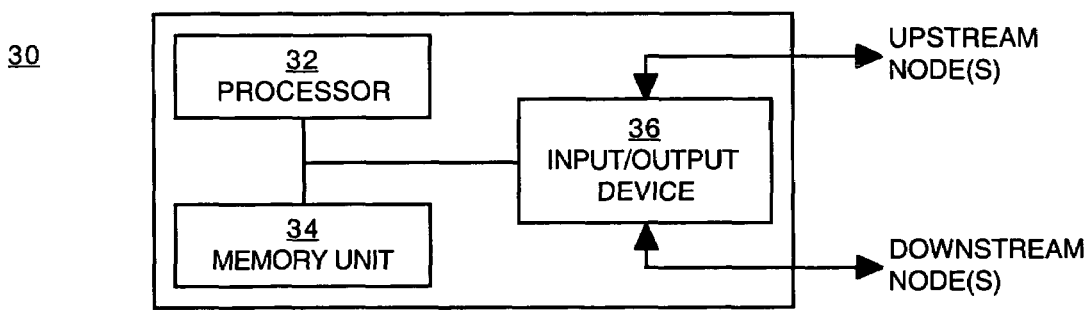
FIG. 3 is a block diagram showing elements of a device upon which embodiments of the present invention can be implemented.

FIG. 3 is a block diagram showing elements of an intelligent device 30 (e.g., a device having elements of a computer system) upon which embodiments of the present invention can be implemented. In one embodiment, device 30 is a switch. Device 30 represents an endpoint in a network like that described above. In general, device 30 comprises a processor 32 for processing information and instructions, a memory unit 34 for storing information and instructions for processor 32, and an input/output device 36, which provides a communication link between upstream nodes and downstream nodes in a network. It is appreciated that device 30 may include elements in addition to or other than the elements illustrated by FIG. 3.

FIG. 4 is a flowchart of a process 400 for checking connectivity that is implemented by an originating endpoint according to an embodiment of the present invention. FIG. 5 is a flowchart 500 of a process for checking connectivity that is implemented by a terminating endpoint according to an embodiment of the present invention.

Although specific steps are disclosed in flowcharts 400 and 500, such steps are exemplary. That is, embodiments of the present invention are well suited to performing various other (additional) steps or variations of the steps recited in flowcharts 400 and 500. It is appreciated that the steps in flowcharts 400 and 500 may be performed in an order different than presented, and that not all of the steps in flowcharts 400 and 500 may be performed.

Referring first to FIG. 4, in step 410, a message is sent from an originating endpoint to a terminating endpoint. In one embodiment, the message is a setup message, and in another embodiment, the message is an add-party message. One function of the message is to establish connectivity with the terminating endpoint as part of a point-to-multipoint connection. Another function of the message is to direct the terminating endpoint to enable detection of CC cells and to not generate CC cells. Continuity checks can therefore be selectively enabled for point-to-multipoint connections.

In step 420, the originating endpoint sends CC cells to the terminating endpoint.

In step 430, the originating endpoint is programmed to refrain from entering the connection into a fail state when CC cells are not received from the terminating endpoint. As noted, a point-to-multipoint connection is uni-directional, and hence the originating endpoint will not receive CC cells from the terminating endpoint even though continuity check functionality is enabled on the originating endpoint. Accordingly, the originating endpoint is programmed to not detect CC cells and to not respond to the absence of CC cells.

Referring now to FIG. 5, in step 510, a terminating endpoint receives a message from an originating endpoint. As mentioned above, the message can be a setup message or an add-party message. The message establishes connectivity between the originating endpoint and the terminating endpoint as part of a point-to-multipoint connection. The message also directs the terminating endpoint to enable detection of CC cells. The message can also be used to direct the terminating endpoint to not generate and/or send CC cells. Alternatively, the terminating endpoint can be initially provisioned to not generate and/or send CC cells.

In step 520, when CC cells from the originating endpoint are not received or detected, then the terminating endpoint can enter the connection into a failed state and/or provide notification to a network manager. The network manager responds to the notification by initiating corrective action steps.

Embodiments of the present invention thus provide operations, administration and maintenance functionality (e.g., continuity checks) for point-to-multipoint connections.

Embodiments of the present invention are thus described. While the present invention has been described in particular embodiments, it should be appreciated that the present invention should not be construed as limited by such embodiments, but rather construed according to the below claims.

What is claimed is:

1. In a network, a method of checking connectivity between endpoints, said method comprising:
    sending a message from an originating endpoint to a first terminating endpoint, said message directing said first terminating endpoint to enable detection of continuity check cells used for checking connectivity between said originating endpoint and said first terminating endpoint, wherein said first terminating endpoint is programmed to suppress generation of continuity check cells; and sending continuity check cells from said originating endpoint to said first terminating endpoint, wherein said originating endpoint is programmed to refrain from acting in response to an absence of continuity check cells from said first terminating endpoint.

2. The method of claim 1 wherein said first terminating endpoint is programmed to suppress generation of continuity check cells in response to said message.

3. The method of claim 1 wherein said message is a setup message used for setting up communication between said originating endpoint and said first terminating endpoint.

4. The method of claim 1 wherein said message is an add-party message for setting up communication between said originating endpoint and a second terminating endpoint over a communication path that includes at least a portion of a communication path between said originating endpoint and said first terminating endpoint.

5. The method of claim 1 wherein said originating endpoint sends the message directing the first terminating endpoint to enable detection of continuity check cells to the first terminating endpoint through an intermediary, and sends continuity check cells from to the first terminating endpoint through the intermediary.

6. The method of claim 1 wherein said first terminating endpoint is one of multiple terminating endpoints receiving broadcast messages from said originating endpoint in a point-to-multipoint connection.

7. The method of claim 1 wherein the first terminating endpoint alerts a network device other than the original endpoint when the first terminating endpoint does not receive the connectivity check cells from the originating endpoint as specified in the message from the originating endpoint directing the first terminating endpoint to enable detection of continuity check cells.

8. In a network, a method of checking connectivity between endpoints, said method comprising:

receiving at a first terminating endpoint a message sent from an originating endpoint, said message directing said first terminating endpoint to enable detection of continuity check cells used for checking connectivity between said originating endpoint and said first terminating endpoint, wherein said first terminating endpoint is programmed to suppress generation of continuity check cells; and providing notification to a network manager other than the originating endpoint when continuity check cells from said originating endpoint are not detected.

9. The method of claim 8 wherein said originating endpoint is programmed to refrain from acting in response to an absence of continuity check cells from said first terminating endpoint.

10. The method of claim 8 wherein said first terminating endpoint is programmed to suppress generation of continuity check cells in response to said message.

11. The method of claim 8 wherein said message is a setup message used for setting up communication between said originating endpoint and said first terminating endpoint.

12. The method of claim 8 wherein said message is an add-party message for setting up communication between said originating endpoint and a second terminating endpoint over a communication path that includes at least a portion of a communication path between said originating endpoint and said first terminating endpoint.

13. The method of claim 8 wherein said first terminating endpoint is one of multiple terminating endpoints receiving broadcast messages from said originating endpoint in a point-to-multipoint connection.

14. A computer-usable medium having computer-readable program code embodied therein for causing a computer system to perform a method of checking connectivity between endpoints in a network, said method comprising:

sending a message from an originating endpoint to a first terminating endpoint, said message directing said first terminating endpoint to enable detection of continuity check cells used for checking connectivity between said originating endpoint and said first terminating endpoint, wherein said first terminating endpoint is programmed to suppress generation of continuity check cells; and sending continuity check cells from said originating endpoint to said first terminating endpoint, wherein said originating endpoint is programmed to refrain from acting in response to an absence of continuity check cells from said first terminating endpoint.

15. The computer-usable medium of claim 14 wherein said first terminating endpoint is programmed to suppress generation of continuity check cells in response to said message.

16. The computer-usable medium of claim 14 wherein said computer system sends the message directing the first terminating endpoint to enable detection of continuity check cells to the first terminating endpoint through an intermediary, and sends continuity check cells from to the first terminating endpoint through the intermediary.

17. The computer-usable medium of claim 14 wherein said first terminating endpoint is one of multiple terminating endpoints receiving broadcast messages from said originating endpoint in a point-to-multipoint connection.

18. A computer-usable medium having computer-readable program code embodied therein for causing a computer system to perform a method of checking connectivity between endpoints in a network, said method comprising:

receiving at a first terminating endpoint a message sent from an originating endpoint, said message directing said first terminating endpoint to enable detection of continuity check cells used for checking connectivity between said originating endpoint and said first terminating endpoints, wherein said first terminating endpoint is programmed to suppress generation of continuity check cells; and providing notification to a network manager other than the originating endpoint when continuity check cells from said originating endpoint are not detected.

19. The computer-usable medium of claim 18 wherein said originating endpoint is programmed to refrain from acting in response to an absence of continuity check cells from said first terminating endpoint.

20. The computer-usable medium of claim 18 wherein said first terminating endpoint is programmed to suppress generation of continuity check cells in response to said message.

21. The computer-usable medium of claim 18 wherein said first terminating endpoint is one of multiple terminating endpoints receiving broadcast messages from said originating endpoint in a point-to-multipoint connection.

22. The computer-usable medium of claim 18 wherein said computer system sends the message directing the first terminating endpoint to enable detection of continuity check cells to the first terminating endpoint through an intermediary, and sends continuity check cells from to the first terminating endpoint through the intermediary.

23. A system for checking connectivity between endpoints in a network, said system comprising:
means for sending a message from an originating endpoint to a first terminating endpoint, said message directing said first terminating endpoint to enable detection of continuity check cells used for checking collectivity between said originating endpoint and said first terminating endpoint, wherein said first terminating endpoint is programmed to suppress generation of continuity check cells; and
means for sending continuity check cells from said originating endpoint to said first terminating endpoint, wherein said originating endpoint is programmed to refrain from acting in response to an absence of continuity check cells from said first terminating endpoint.

24. The system of claim 23 wherein the first terminating endpoint alerts a network device other than the original endpoint when the first terminating endpoint does not receive the connectivity check cells from the originating endpoint as specified in the message from the originating endpoint directing the first terminating endpoint to enable detection of continuity check cells.

25. A system for checking connectivity between endpoints in a network, said system comprising:
means for receiving at a first terminating endpoint a message sent from an originating endpoint, said message directing said first terminating endpoint to enable detection of continuity check cells used for checking connectivity between said originating endpoint and said first terminating endpoints, wherein said first terminating endpoint is programmed to suppress generation of continuity check cells; and
means for providing notification to a network manager other than the originating endpoint when continuity check cells from said originating endpoint are not detected.

26. The system of claim 25 wherein said originating endpoint is programmed to refrain from acting in response to an absence of continuity check cells from said first terminating endpoint.

27. The system of claim 25 wherein said first terminating endpoint is programmed to suppress generation of continuity check cells in response to said message.

28. The system of claim 25 further comprising:
means for sending the message directing the first terminating endpoint to enable detection of continuity check cells to the first terminating endpoint through an intermediary; and
means for sends continuity check cells from to the first terminating endpoint through the intermediary.

29. A device comprising:
a memory unit; and
a controller coupled to said memory unit, said controller for checking connectivity between endpoints in a network by:
sending a message to a first terminating endpoint, said message directing said first terminating endpoint to enable detection of continuity check cells used for checking connectivity between said device and said first terminating endpoint, wherein said first terminating endpoint is programmed to suppress generation of continuity check cells;
sending continuity check cells to said first terminating endpoint; and
refraining from acting in response to an absence of continuity check cells from said first terminating endpoint.

30. The device of claim 29 wherein said first terminating endpoint is programmed to suppress generation of continuity check cells in response to said message.

31. The device of claim 29 wherein said device sends the message directing the first terminating endpoint to enable detection of continuity check cells to the first terminating endpoint through an intermediary, and sends continuity check cells from to the first terminating endpoint through the intermediary.

32. The device of claim 29 wherein said message is a broadcast message sent to multiple terminating endpoints including said first terminating endpoint.

33. A device comprising:
a memory unit; and
a controller coupled to said memory unit, said controller for checking connectivity between endpoints in a network by:
receiving a message sent from an originating endpoint, said message directing said device to enable detection of continuity check cells used for checking connectivity between said originating endpoint and said device;
suppressing generation of continuity check cells; and
providing notification to a network manager other than the originating endpoint when continuity check cells from said originating endpoint are not detected.

34. The device of claim 33 wherein said originating endpoint is programmed to refrain from acting in response to an absence of continuity check cells from said device.

35. The device of claim 33 wherein said device is programmed to suppress generation of continuity check cells in response to said message.

36. The device of claim 33 wherein said device is one of multiple devices receiving broadcast messages from said originating endpoint in a point-to-multipoint connection.

* * * * *

UNITED STATES PATENT AND TRADEMARK OFFICE
CERTIFICATE OF CORRECTION

| | | |
|---|---|---|
| PATENT NO. | : 7,330,437 B1 | Page 1 of 1 |
| APPLICATION NO. | : 10/632647 | |
| DATED | : February 12, 2008 | |
| INVENTOR(S) | : Puneet Gupta et al. | |

It is certified that error appears in the above-identified patent and that said Letters Patent is hereby corrected as shown below:

At column 9, line 9, please replace "collectivity" with --connectivity--.

At column 9, line 52 please replace "sends" with --sending--.

Signed and Sealed this

Twenty-second Day of December, 2009

David J. Kappos
*Director of the United States Patent and Trademark Office*